United States Patent
Sutera et al.

(10) Patent No.: US 6,832,180 B1
(45) Date of Patent: Dec. 14, 2004

(54) METHOD FOR REDUCING NOISE IN INTEGRATED CIRCUIT LAYOUTS

(75) Inventors: Massimo Sutera, Sunnyvale, CA (US); Alan Smith, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/430,350

(22) Filed: Oct. 29, 1999

(51) Int. Cl.[7] ............................ G06F 17/50; G06G 7/58
(52) U.S. Cl. ............................ 703/13; 703/14; 703/18; 716/1; 716/6; 716/8; 716/17
(58) Field of Search ........................... 703/13, 14, 18; 716/1, 6, 8, 17

(56) References Cited

U.S. PATENT DOCUMENTS

| | | | | |
|---|---|---|---|---|
| 5,019,724 A | * | 5/1991 | McClure ...................... | 326/29 |
| 5,402,356 A | * | 3/1995 | Schaefer et al. ............... | 716/1 |
| 5,596,506 A | * | 1/1997 | Petschauer et al. ............ | 716/5 |
| 5,666,288 A | * | 9/1997 | Jones et al. .................... | 716/17 |
| 5,799,170 A | * | 8/1998 | Drumm et al. ................ | 716/2 |
| 5,838,581 A | * | 11/1998 | Kuroda ........................... | 716/8 |
| 5,859,776 A | * | 1/1999 | Sato et al. ..................... | 700/121 |
| 6,044,209 A | * | 3/2000 | Alpert et al. ................... | 716/6 |
| 6,117,182 A | * | 9/2000 | Alpert et al. ................... | 716/8 |
| 6,341,365 B1 | * | 1/2002 | Dwyer et al. ................... | 716/8 |
| 6,405,350 B1 | * | 6/2002 | Tawada ........................... | 716/5 |

OTHER PUBLICATIONS

Li et al.; "A repeater optimization methodology for deep sub–micron high performance processors"; IEEE Int. Conf. ICCD Proceedings; pp. 726–731; Oct. 1997.*

Yang et al.; Deep submicron on–chip crosstalk; IEEE Proc. 16th Inst. Meas. Tech. Conf.; pp. 1788–1793; May 1999.*

Davis et al.; Length, scaling, and material dependence of crosstalk between distributed RC Interconnects; IEEE Int. Conf. Interconnect Tech.; pp. 227–229; May 1999.*

Oh et al.; A scaling scheme and optimization methodology for deep sub–micron interconnect; IEEE Int. Conf. Computer Design; pp. 320–325; Oct. 1996.*

Lillis et al.: "Optimal wire sizing and buffer insertion for low power and a generalized delay model"; IEEE; pp. 437–447; Mar. 1996.*

Dhar et al.; "Optimun buffer circuits for driving long uniforn lines"; IEEE J. Solid State Ckts; pp. 32–40; Jan. 1991.*

Alpert et al.; "Buffer insertion for noise and delay optimization"; IEEE Proc. 98 Design Automation Conf.; pp. 362–367; Jun. 1998.*

Culetu et al.; "A practical repeater insertion method in high speed VLSI circuits"; IEEE 98 Design Automation Conf.; pp. 392–395; Jun. 1998.*

Cong; "Modeling and layout optimization of VLSI devices and interconnects in deep submicron design"; IEEE 97 Design Automation Conf.; pp. 121–126; Jan. 1997.*

Shah et al.; "Wiresizing with buffer placement and sizing for power–delay tradoffs"; IEEE 96 Proc. Design Automation Conf; pp. 346–351; Jan. 1996.*

* cited by examiner

*Primary Examiner*—Hugh Jones
(74) *Attorney, Agent, or Firm*—Martine & Penilla, LLP

(57) ABSTRACT

A method for minimizing noise in an integrated circuit is described, the method including choosing a net to be analyzed, determining that the total path length of conductive paths coupled to a driver within the net exceed a maximum acceptable length for that given driver according to the minimum acceptable noise levels for that given net, and inserting at least one buffer within the net at a position which is within the maximum acceptable length for conductive paths coupled to the driver.

22 Claims, 4 Drawing Sheets

US 6,832,180 B1

METHOD FOR REDUCING NOISE IN INTEGRATED CIRCUIT LAYOUTS

BACKGROUND OF THE INVENTION

1. Field of the Invention

The present invention relates to noise problems in integrated circuits. More particularly, the present invention provides a method for inserting buffers into an integrated circuit layout during the place and route stage in order to reduce the overall noise introduced into conductive paths in a given design.

2. The Background Art

As the speed of signals within integrated circuits increases and the distance between conductive paths decreases, the problem of reducing the susceptibility of conductive paths to noise becomes increasingly important.

In the prior art conversion process between design and layout for integrated circuit systems, there are four major steps which are accomplished by system designers. Those four major steps include place and route of the standard cell design, physical design verification to ensure consistency between the layout and the schematic, parisitic extraction of the interconnect, and analysis of the extracted data to generate a noise analysis report.

When correcting the physical circuit layout in a prior art conversion process, a designer typically must either manually move wires and circuits in order to minimize or eliminate those noise problems, or may instead increase the size of the driver supplying signals to a conductive path which is deemed to be noise sensitive.

This manual process is extremely time-consuming and very tedious because moving conductive paths or increasing drivers is likely to cause new noise problems. Those new noise problems must then be corrected, potentially causing yet a third set of noise problems. Thus, manually correcting a circuit layout in order to solve noise problems often requires considerable effort and several very time-consuming iterations.

It would therefore be beneficial to provide a method for automatically determining potentially noisy areas within circuit layouts at the place and route stage, and for correcting problems related to areas of specific concern.

SUMMARY OF THE INVENTION

A method for minimizing noise in an integrated circuit is described, the method including choosing a net to be analyzed, determining that the total path length of conductive paths coupled to a driver within the net exceeds a maximum acceptable length for that driver according to the minimum acceptable noise levels for that given net, and inserting at least one buffer within the net at a position which is within the maximum acceptable length for conductive paths coupled to the driver.

DETAILED DESCRIPTION OF ONE EMBODIMENT

Those of ordinary skill in the art will realize that the following description of the present invention is illustrative only and not in any way limiting. Other embodiments of the invention will readily suggest themselves to such skilled persons who are familiar with this disclosure.

The present invention provides a method for correcting potentially noisy circuit layouts at the place and route stage during the process of converting an electronic design into a physical circuit layout.

Figure 1:
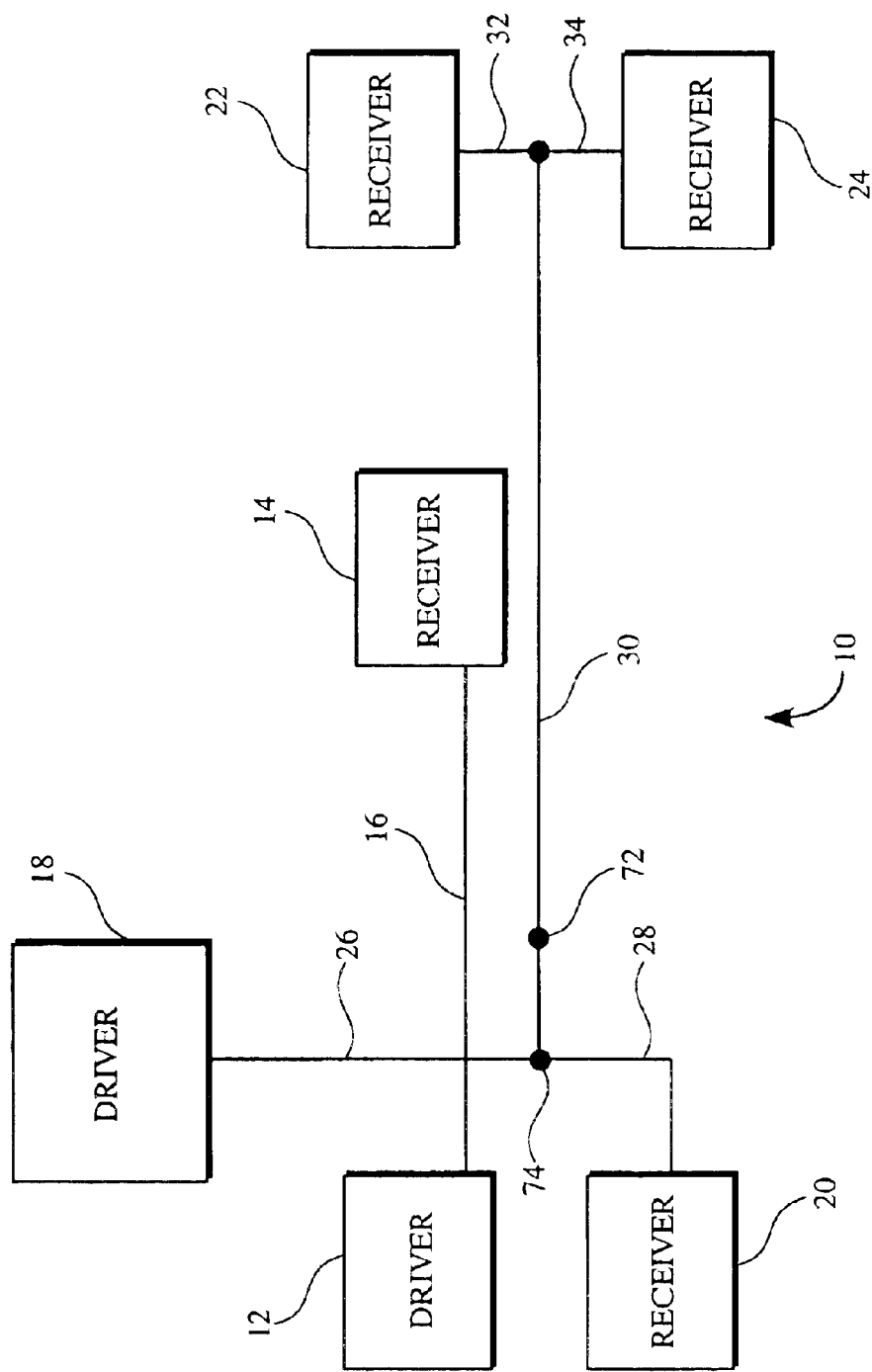
FIG. 1 is a block diagram of a prior art physical circuit layout having potential noise problems.

FIG. 1 is a block diagram of a prior art physical circuit layout having potential noise problems.

Figure 4:
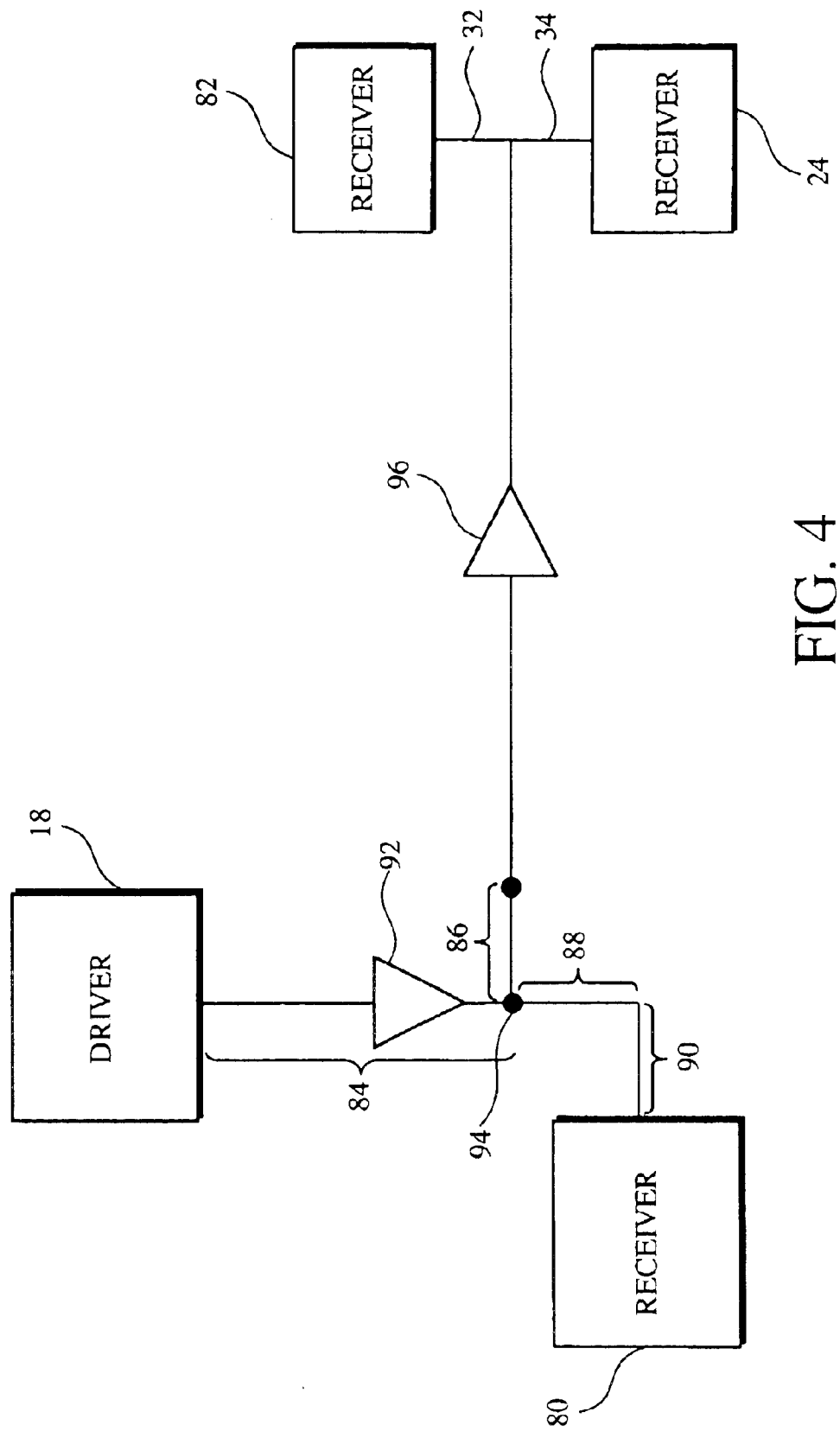
FIG. 4 shows the example of FIG. 1 after having placed buffers according to a method of the present invention.

When referring to FIG. 1 and FIG. 4, it should be considered that driver and receiver labels may be substituted for one another due to the fact that some receivers can actually be drivers, vice-versa. Referring to FIG. 1, layout 10 includes driver/receivers 12 and 14 coupled together using conductive path 16. Further included are driver/receivers 18 and 20, driver 22 and receiver 24. Driver/receiver 18 is coupled to driver/receiver 20 using conductive path segments 26 and 28. At the intersection of conductive path segments 26 and 28, a conductive path segment 30 is coupled thereto. Driver 22 and receiver 24 are coupled to conductive path segments 32 and 34 respectively. Conductive path segments 32 and 34 are further coupled to conductive path segment 30.

The present invention analyzes each net (i.e., conducting path between connected drivers/receivers) individually to determine whether a given net is likely to have more than an acceptable level of noise coupled to it from external sources. External sources are considered to be anything other than net components such as driver/receiver combinations or drivers or receivers individually.

Although the coupling capacitance between interconnects is a source of potential coupling noise problems, the symptom of the noise peak is demonstrated at the output of the receiving cell. Different CMOS cells have differing tolerance for coupling noise impinging on their inputs. The choice for the maximum allowable wire length for noise violations to be prevented is therefore not only dependent on the strength of the victim and aggressor drivers, but also on the type of cell at the end of the victim interconnect.

The present invention noise analysis is performed using well-known curves for various driver circuits of noise amplitude vs. the length of a conductive path coupled to that driver circuit. It is well-known that a conductive path of a given length being driven by a weak driver will have a higher susceptibility to noise than that same conductive path when driven by a stronger driver.

For each conductive path, there is a given amount of noise that can be tolerated, depending on what signals on that conductive path are accomplishing. It is up to the circuit designer to determine what the acceptable levels of noise will be on the various types of conductive paths being used in a given design. Such an acceptable level might be pictorially represented as line 40 in FIG. 2. The point at which line 40 intersects with a driver noise amplitude line determines the maximum length of conductive path that may be between a driver in the receiver without any intervening circuitry such as buffers or other circuits.

Figure 3:
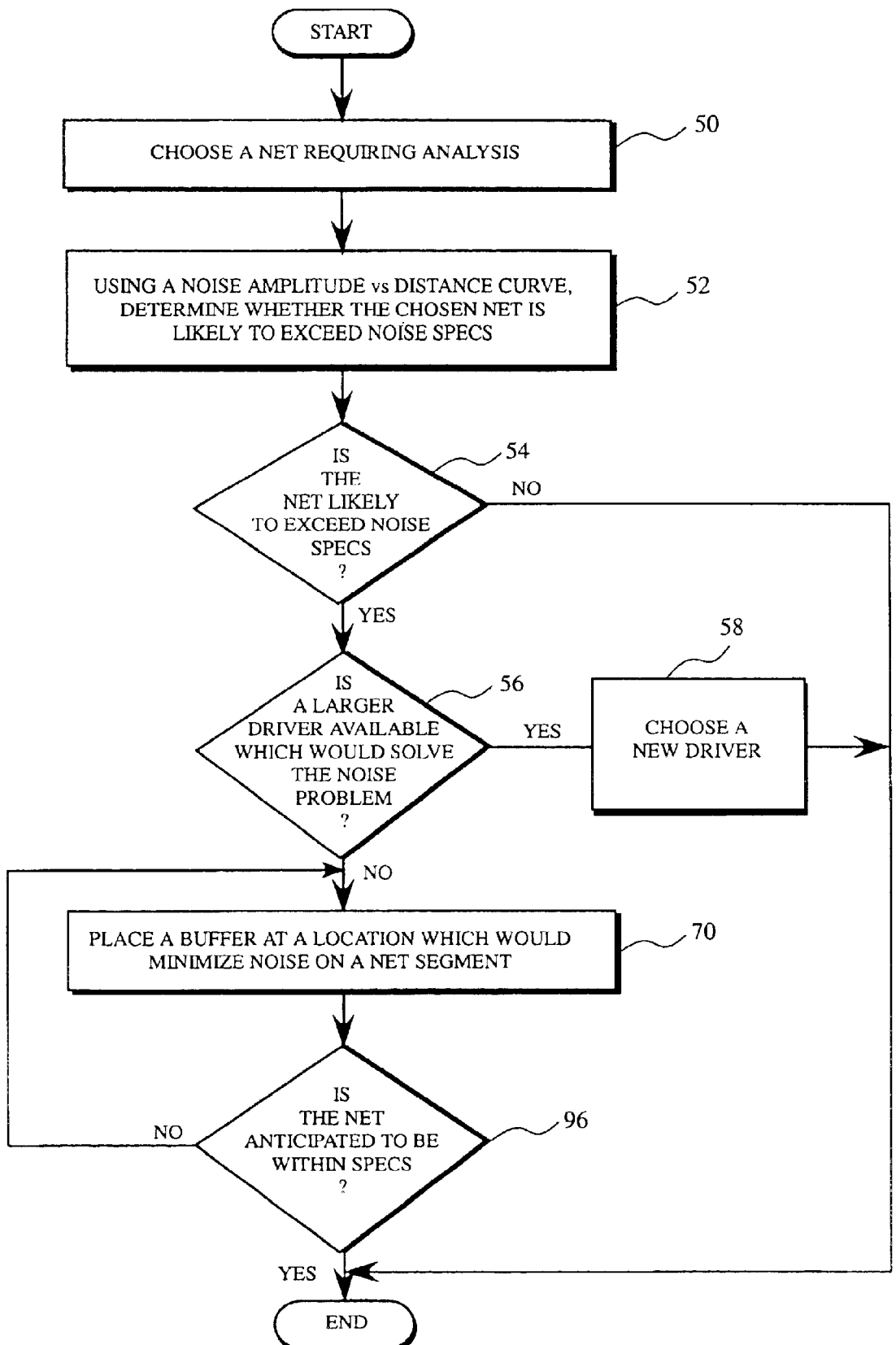
FIG. 3 is a flowchart depicting a method of the present invention.

FIG. 3 is a flowchart depicting a method of one embodiment of the present invention.

Referring to FIG. 3, the method begins at block 50 where a net is chosen for analysis. It is contemplated that all critical nets in a given design will be analyzed. However, not all nets in every design will necessarily be analyzed according to the present invention.

At block 52, using the noise amplitude vs. distance (i.e., conductor path length) data which is known by those of ordinary skill in the art and the acceptable noise levels previously determined for that given circuit type, it is determined whether the net chosen at block 50 is likely to exceed the acceptable noise levels. That question is posed at block 54, and if the chosen net is likely to exceed maximum acceptable noise levels, it is determined, at block 56, whether a larger driver is available in the driver library which would solve the problem. If so, the method proceeds at block 58 where a larger driver is chosen to replace the previously determined weaker driver, thus solving the noise problem for this net.

Figure 2:
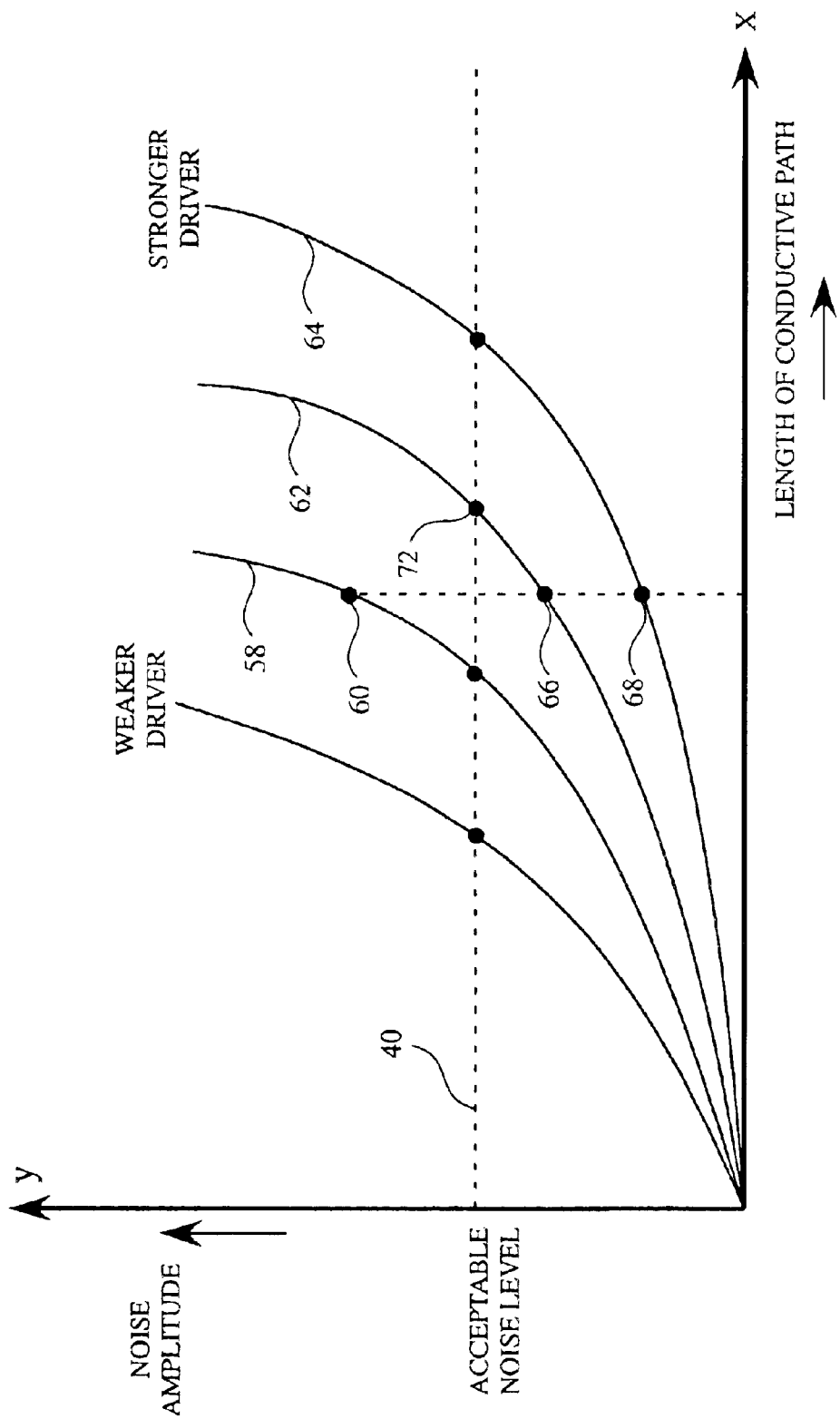
FIG. 2 shows a prior art curve of noise amplitude vs. conductive path length.

An example of a larger driver solving the problem is seen in FIG. 2 where, in this example, the driver having the characteristics shown by curve 58 might have been originally chosen for the physical layout. Suppose in this example, point 60 on curve 58 represents the length of the conductive path being analyzed. It is easily seen that point 60 is above the acceptable noise level line 40. However, curves 62 and 64, representing stronger drivers, for the same length of conductive path would result in acceptable noise levels as represented by points 66 and 68 respectively.

If, at step 56, a larger driver was not available, the method proceeds at block 70 where a buffer is placed at a location which would increase signal levels on the net. Locations where buffers (i.e., drivers) are placed may be thought to be locations where the previous net ends and a new net begins. Thus, a buffer is placed at a location which would cause the conductive path between the driver and the buffer to be shorter than would otherwise have occurred. Since the conductive path is shorter, there is less susceptibility to noise.

In order to properly place a buffer so as to minimize the noise in a given net, it is necessary to know the point at which acceptable noise level line 40 in FIG. 2 crosses the curve for the given driver. Thus, if a driver is employed which is represented by curve 62, it is necessary to know where point 72 is located. Knowing where point 72 is located gives you the maximum length of conductive path allowed in order to achieve an acceptable noise level for that conductive path.

When determining where to place a buffer, it is important to recognize that a conductive path includes all conductive path segments leaving a given driver, including all intersecting paths. Using the example of FIG. 1, the total length of conductive path segments between driver/receiver 18 and point 72 on conductive path segment 30 includes all of conductive path segment 26, all of conductive path segment 28, and that portion of conductive path 30 between point 72 and intersection point 74.

In another embodiment of the present invention, a net downstream from the stronger replacement driver inserted in block 58, may subsequently be found to have an unacceptable noise amplitude. In this instance, one or more buffers can be inserted into the net downstream from the stronger driver as indicated in blocks 70 and 96.

Referring to FIG. 1 and FIG. 4, the net which includes driver/receiver 12, driver/receiver 14, and conductive path 16 has not been duplicated because it was previously determined that this net resulted in acceptable noise levels. The remaining net includes driver/receiver 18 and receiver 24 from FIG. 1, new driver/receiver 80, and new driver 82.

Assume now that it is time to analyze driver/receiver 18 and the conductive paths coupled thereto. Using the curve associated with driver/receiver 18, a given maximum length for conductive paths coupled to driver/receiver 18 will be known because the maximum acceptable length for those conductive paths will have been determined by knowing the maximum acceptable noise level allowed on those conductive paths.

Assume that the various lengths of conductive path segments 84, 86, 88, and 90 add up to the maximum acceptable length for a conductive path coupled to driver/receiver 18. It is acceptable then, to provide a buffer at any point on conductive paths 84, 86, 88, or 90.

It is most desirable at this point, to determine if there are timing issues with respect to driver/receiver 18 and/or driver/receiver 80 which would make it more desirable to place a buffer in either conductive path segment 84 or either of conductive path segments 88 or 90. If it is critical that signals being transmitted from driver/receiver 80 travel more quickly over the various conductive paths to, for example, receiver 24, it would be more beneficial to place a required buffer within conductive path 84, rather than, for example, within conductive path 86.

Now assume that buffer 92 has been placed within conductive path 84 because it is necessary that signals from driver/receiver 80 arrive at receiver 24 as quickly as possible. Once buffer 92 has been placed, the new question becomes whether the total conductive path length between the output of buffer (i.e., driver) 92 and the input to receiver 24 meets the previously defined criteria for noise.

If the previously defined criteria for noise is not met by the remaining total conductive path length, it is again necessary, at block 96 of FIG. 3, to determine where to place another buffer. Now, the FIG. 2 curve to be used is that curve associated with buffer 92. A new maximum acceptable path length will be determined from that curve, and it may be necessary to add a second buffer such as buffer 96 in FIG. 4.

Those of ordinary skill in the art having the benefit of this disclosure would readily recognize that the methods described herein may easily be incorporated in place and route software. It is also contemplated that the methods described herein may be incorporated into a state machine or other application-specific integrated circuits.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for minimizing noise in an integrated circuit comprising:

choosing a net to be analyzed;

determining a total path length of conductive paths coupled to a driver within the net;

examining a noise amplitude versus length of conduction path curve associated with the driver to determine a noise level associated with the total path length of conductive paths coupled to the driver;

comparing the noise level associated with the total path length of conductive paths coupled to the driver to a maximum acceptable noise level;

identifying the noise level associated with the total path length of conductive paths coupled to the driver as exceeding the maximum acceptable noise level;

examining the noise amplitude versus length of conduction path curve associated with the driver to determine a modified total path length of conductive paths coupled to the driver that corresponds to a modified noise level that is less than the maximum acceptable noise level; and modifying the net to reduce the total path length of conductive paths coupled to the driver to be less than or equal to the modified total path length of conductive paths.

2. The method for minimizing noise in an integrated circuit according to claim 1, wherein the curve defines a relationship between noise amplitude and conduction path length for a particular strength of the driver.

3. The method for minimizing noise in an integrated circuit according to claim 2, wherein the curve defines a maximum allowable noise amplitude for the net.

4. The method for minimizing noise in an integrated circuit according to claim 1, wherein modifying the net includes inserting at least one buffer within the net.

5. The method for minimizing noise in an integrated circuit according to claim 4, wherein the curve associated with the driver defines a relationship between noise amplitude and conduction path length for a particular strength of the driver.

6. The method for minimizing noise in an integrated circuit according to claim 1, wherein determining the total path length of conductive paths coupled to the driver within the net includes a plurality of intersecting conduction paths.

7. The method for minimizing noise in an integrated circuit according to claim 6, further comprising:

identifying a timing issue associated with one or more conduction paths within the plurality of intersecting conduction paths; and choosing an insertion position of at least one buffer to be within one of the plurality of intersecting conduction paths that is not identified as being associated with the timing issue.

8. A computer readable media containing program instructions that, when executed, exercise code for minimizing noise in an integrated circuit, the computer readable media comprising:

program instructions for choosing a net to be analyzed;

program instructions for determining a total path length of conductive paths coupled to a driver within the net;

program instructions for examining a noise amplitude versus length of conduction path curve associated with the driver to determine a noise level associated with the total path length of conductive paths coupled to the driver;

program instructions for comparing the noise level associated with the total path length of conductive paths coupled to the driver to a maximum acceptable noise level;

program instructions for identifying the noise level associated with the total path length of conductive paths coupled to the driver as exceeding the maximum acceptable noise level;

program instructions for examining the noise amplitude versus length of conduction path curve associated with the driver to determine a modified total path length of conductive paths coupled to the driver that corresponds to a modified noise level that is less than the maximum acceptable noise level; and program instructions for modifying the net to reduce the total path length of conductive paths coupled to the driver to be less than or equal to the modified total path length of conductive paths.

9. The computer readable media containing program instructions that, when executed, exercise code for minimizing noise in an integrated circuit according to claim 8, wherein the curve defines a relationship between noise amplitude and conduction path length for a particular strength of the driver.

10. The computer readable media containing program instructions that, when executed, exercise code for minimizing noise in an integrated circuit according to claim 9, wherein the curve defines a maximum allowable noise amplitude for the net.

11. The computer readable media containing program instructions that, when executed, exercise code for minimizing noise in an integrated circuit according to claim 8, wherein the program instructions for modifying the net includes program instructions for inserting at least one buffer within the net.

12. The computer readable media containing program instructions that, when executed, exercise code for minimizing noise in an integrated circuit according to claim 11, wherein the curve associated with the driver defines a relationship between noise amplitude and conduction path length for a particular strength of the driver.

13. The computer readable media containing program instructions that, when executed, exercise code for minimizing noise in an integrated circuit according to claim 8, wherein the total path length of conductive paths coupled to the driver within the net includes a plurality of intersecting conduction paths.

14. The computer readable media containing program instructions that, when executed, exercise code for minimizing noise in an integrated circuit according to claim 13, further comprising:

program instructions for identifying a timing issue associated with one or more conduction paths within the plurality of intersecting conduction paths; and program instructions for choosing an insertion position of at least one buffer to be within one of the plurality of intersecting conduction paths that is not identified as being associated with the timing issue.

15. A method for minimizing noise in an integrated circuit comprising:

choosing a net to be analyzed;

determining a total path length of conductive paths coupled to a first driver within the net;

examining a first noise amplitude versus length of conduction path curve associated with the first driver to determine a first noise level associated with the total path length of conductive paths;

comparing the first noise level associated with the total path length of conductive paths to a maximum acceptable noise level;

identifying the first noise level as exceeding the maximum acceptable noise level;

examining a second noise amplitude versus length of conduction path curve associated with a second driver to determine a second noise level associated with the total path length of conductive paths;

comparing the second noise level associated with the total path length of conductive paths to the maximum acceptable noise level;

identifying the second noise level as not exceeding the maximum acceptable noise level; and replacing the first driver with the second driver.

16. The method for minimizing noise in an integrated circuit according to claim 15, wherein the curve defines a relationship between noise amplitude and conduction path length for a particular strength of the driver.

17. The method for minimizing noise in an integrated circuit according to claim 16, wherein the curve defines a maximum allowable noise amplitude for the net.

18. The method for minimizing noise in an integrated circuit according to claim 15, wherein determining the total path length of conductive paths coupled to the driver within the net includes a plurality of intersecting conduction paths.

19. A computer readable media containing program instructions that, when executed, exercise code for minimizing noise in an integrated circuit, the computer readable media comprising:

program instructions for choosing a net to be analyzed;

program instructions for determining a total path length of conductive paths coupled to a first driver within the net;

program instructions for examining a first noise amplitude versus length of conduction path curve associated with the first driver to determine a first noise level associated with the total path length of conductive paths;

program instructions for comparing the first noise level associated with the total path length of conductive paths to a maximum acceptable noise level;

program instructions for identifying the first noise level as exceeding the maximum acceptable noise level;

program instructions for examining a second noise amplitude versus length of conduction path curve associated with a second driver to determine a second noise level associated with the total path length of conductive paths;

program instructions for comparing the second noise level associated with the total path length of conductive paths to the maximum acceptable noise level;

program instructions for identifying the second noise level as not exceeding the maximum acceptable noise level; and program instructions for replacing the first driver with the second driver.

20. The computer readable media containing program instructions that, when executed, exercise code for minimizing noise in an integrated circuit according to claim 19, wherein the curve defines a relationship between noise amplitude and conduction path length for a particular strength of the driver.

21. The computer readable media containing program instructions that, when executed, exercise code for minimizing noise in an integrated circuit according to claim 20, wherein the curve defines a maximum allowable noise amplitude for the net.

22. The computer readable media containing program instructions that, when executed, exercise code for minimizing noise in an integrated circuit according to claim 19, wherein the total path length of conductive paths coupled to the driver within the net includes a plurality of intersecting conduction paths.

* * * * *